US006611980B2

(12) United States Patent
Wempe (10) Patent No.: US 6,611,980 B2
(45) Date of Patent: Sep. 2, 2003

(54) MOLDED CUSHION AND METHOD OF MAKING THE SAME

(75) Inventor: Patrick L. Wempe, 2201 SW. 31st. Ter., Topeka, KS (US) 66611-1807

(73) Assignee: Patrick L. Wempe, Tecumseh, KS (US)

( * ) Notice: Subject to any disclaimer, the term of this patent is extended or adjusted under 35 U.S.C. 154(b) by 64 days.

(21) Appl. No.: 09/816,978

(22) Filed: Mar. 23, 2001

(65) Prior Publication Data

US 2001/0013146 A1 Aug. 16, 2001

Related U.S. Application Data (63) Continuation-in-part of application No. 09/498,526, filed on Feb. 4, 2000.

(51) Int. Cl.⁷ .............................. A47C 7/20; B68G 5/02
(52) U.S. Cl. .................................. 5/654; 5/653; 5/655.4
(58) Field of Search ..................... 5/654, 653, 655.4, 5/644, 911

(56) References Cited

U.S. PATENT DOCUMENTS

| | | | | | |
|---|---|---|---|---|---|
| 3,375,822 A | * | 4/1968 | Rose | .............................. | 602/8 |
| 3,393,012 A | * | 7/1968 | Chancellor, Jr. | ............ | 5/653 X |
| 3,608,961 A | | 9/1971 | VonHeck | | |
| 3,640,787 A | * | 2/1972 | Heller | .......................... | 156/77 |
| 3,830,896 A | * | 8/1974 | Flicker et al. | ............ | 5/655.4 X |
| 4,114,214 A | | 9/1978 | VonHeck | | |
| 4,327,046 A | | 4/1982 | Davis et al. | | |
| 4,347,213 A | | 8/1982 | Rogers, Jr. | | |
| 4,388,358 A | * | 6/1983 | Davis et al. | .................. | 428/71 |
| 4,615,856 A | | 10/1986 | Silverman | | |
| 4,622,185 A | | 11/1986 | Kostich | | |
| 4,828,325 A | | 5/1989 | Brooks | | |
| 4,912,788 A | | 4/1990 | Lonardo | | |
| 4,930,171 A | | 6/1990 | Frantz | | |
| 4,951,336 A | | 8/1990 | Silverman | | |
| 5,088,747 A | * | 2/1992 | Morrison et al. | ........... | 5/654 X |
| 5,294,181 A | | 3/1994 | Rose et al. | | |
| 5,449,478 A | | 9/1995 | Gay et al. | | |
| 5,556,169 A | | 9/1996 | Parrish et al. | | |
| 5,592,706 A | * | 1/1997 | Pearce | ............................ | 5/654 |
| 5,643,513 A | | 7/1997 | Searle | | |
| 5,829,081 A | * | 11/1998 | Pearce | ............................ | 5/654 |
| 6,279,184 B1 | * | 8/2001 | George, II | ..................... | 5/652 |
| 2001/0013146 A1 | * | 8/2001 | Wempe | ......................... | 5/654 |
| 2002/0078508 A1 | * | 6/2002 | George, II | ................. | 5/653 X |

FOREIGN PATENT DOCUMENTS

EP 606670 A1 * 7/1994 ..................... 5/911

* cited by examiner

Primary Examiner—Robert G. Santos
(74) Attorney, Agent, or Firm—Stinson Morrison Hecker, LLP (57) ABSTRACT

The present invention is directed to a custom-contoured cushion for a wheelchair or other seating device and a method of making the same. In one embodiment, the novel custom-contoured cushion is comprised of a stretchable bag filled with soft and resilient closed-cell foam pellets adhered together by and/or embedded within an elastomeric polymerizable adhesive. The pellets do not absorb a significant amount of the adhesive and, after molding, remain sufficiently soft and resilient to provide a comfortable and durable cushion.

Alternatively, the cushion contains soft and resilient pellets, but does not contain the elastomeric polymerizable adhesive. In the first embodiment, the custom-molded, custom-contoured cushion is made by mixing the pellets with the adhesive to form a pellet/adhesive mixture, positioning the user on a bag filled with the pellet/adhesive mixture, molding the mixture around the user to provide cushioning around the user's seating surface, and allowing the adhesive to cure. The pellets and adhesive may either be added to the bag separately and mixed within the has, or may be mixed outside the bag, after which the pellet/adhesive mixture is added to the bag.

24 Claims, 3 Drawing Sheets

MOLDED CUSHION AND METHOD OF MAKING THE SAME

CROSS-REFERENCE TO RELATED APPLICATION

This application is a Continuation-in-Part of U.S. patent application Ser. No. 09/498,526, filed on Feb. 4, 2000, which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

This invention relates to custom-molded cushions, and is particularly well-adapted to custom-molded seating cushions designed for use with seated mobility systems such as wheelchairs.

2. Description of Related Art

Seated mobility platforms, wheelchairs and other seated mobility systems (hereinafter "wheelchairs") provide a means of movement, positioning and postural support for persons with physical disabilities or deformities. These persons remain seated in or on the wheelchair, often in a fixed position, throughout most of their daily activities. Proper seating and positioning in the wheelchair is necessary to prevent pressure sores, to increase comfort and sitting tolerance, and to improve circulation, range of motion, respiratory function and digestion, all of which allow the user to achieve a higher degree of function and interaction with his or her environment.

Mass-produced wheelchair cushions, including inflatable cushions, jell pads and layered foam pads, are well known. Although mass-produced cushions are inexpensive and provide adequate support and positioning for some individuals, other persons require a padding system including contoured and form-fitting cushions. To such end, various types of custom-contoured wheelchair cushions, and methods for making such cushions, have been employed in an effort to form a seat that is "molded" to the shape of the portion of the user that contacts the wheelchair seat, i.e., the user's "seating surface."

For example, U.S. Pat. No. 4,615,856 discloses forming an impression of the user's seating surface on a bead-filled bag and removing air from the bag to fix the impression. A positive mold of the individual's impression is made from the bag, and is utilized to mold a customized seat cushion. In a similar method, the shape of the bead-filled bag is scanned into a computer which then cuts a cushion of the same shape out of a foam block. Although these methods are capable of creating fairly accurate and usable seating, the methods are labor intensive, take a considerable amount of time to complete and are expensive.

Another method for producing custom-contoured cushions is the foam-in-place method. In the foam-in-place method, a low density, high foaming two-part foam is mixed and poured into a flexible enclosure. As the foam begins expanding, the bag is placed on a simulator chair frame and the user is then positioned on the bag. The foam quickly expands around the user and cures with an imprint of the user on the cushion surface. The foam cushion is then covered with a suitable material to protect it from contaminants and moisture. The resultant cushion is very soft, but does not provide a great deal of support to the user.

Although the foam-in-place method can produce a cushion with a fairly accurate contoured surface, the speed at which the material foams and cures makes it difficult to mold the foam properly around the user. Further, the user can easily "bottom out" by displacing the uncured foam under the ischium, where it is needed most. Unfortunately, attempts to mold the foam around the user and work the foam under the ischium can cause tiny bubbles in the expanding foam to collapse, resulting in hard spots within the cushion. Poor mixing of the foam can also create inconsistent texture and density within the cushion, which can be uncomfortable to the user and cause pressure sores. Further, the expanding foam often leaks out of the bag creating a mess on the user, the cushion, the technician and the simulator chair.

Another method of customizing a cushion involves hand carving different densities of foam into pads of various shapes, which are then upholstered by traditional methods. Such customized cushions can be expensive to install and maintain and are generally less accurate than other customized cushions. The inaccuracy can result in pressure points that create soreness and discomfort for the user. Further, the external hardware required to position the pads is unsightly and, more importantly, may limit the user's range of motion.

Although these known custom-contoured cushions are suitable for their intended purpose, a need remains for an inexpensive, easy to manufacture custom-contoured seat cushion that provides the comfort and support required by the intended user.

Thus, an object of the present invention is to provide a custom-contoured seat cushion that accurately conforms to the shape of the intended user's seating surface and provides postural support to the user.

It is a further object of the present invention to provide such a custom-contoured cushion that is resilient and fairly soft.

Another object of the invention is to provide a method of making such a cushion that can be completed in one to two days.

It is yet another object of the invention to provide a custom-contoured cushion that has a uniform texture and density.

It is another object of the invention to provide an aesthetically pleasing custom-contoured cushion.

Yet another object of the present invention is to provide a high quality, low maintenance and durable cushion that is aesthetically pleasing.

SUMMARY OF THE INVENTION

The present invention is directed to a custom-contoured cushion for use as a seat bottom, seat back, headrest or other type of cushion for a wheelchair, or other seating device. The novel custom-contoured cushion is comprised of a stretchable bag having an opening that is in a closed position when the cushion is in use. The bag is filled with soft and non-absorbent pellets adhered together by and/or embedded within an elastomeric polymerizable adhesive, preferably a two-part low-foaming polyurethane adhesive. The pellets are sufficiently soft and resilient to provide a comfortable and durable cushion and are non-absorbent, so as not to absorb the adhesive, which could create inconsistencies in the texture and density of the cushion. In a preferred embodiment the cushion has been molded to conform to the shape of an object. Preferably, the cushion has been custom-molded to conform to the shape of the seating surface of an intended user.

The cushion may optionally include a baseboard to add structure and support to the cushion. Additional structure and support can be provided by generally L-shaped support guides, affixed along opposing edges of the baseboard. In one embodiment, the support guides are tall enough to obviate the need for separate modular hip and lateral support pads that are often added to wheelchairs. The baseboard and/or support guides may be affixed around the outside of the custom-contoured cushion or positioned within the cushion bag. In either embodiment, conventional wheelchair hardware may be mounted onto the baseboard to facilitate installation of the cushion onto the wheelchair or other support structure.

In an alternative embodiment, the cushion of the present invention does not contain an adhesive to adhere the pellets together. In such embodiment, the pellets are able to move relative to each other within the bag after construction is completed. Each time the user sits on the cushion, the pellets will deform to conform to the shape of the user's seating surface. The user may purchase such a cushion "off the shelf" and use it with an existing chair for added comfort. Such "off the shelf" cushions will preferably be formed in appropriate dimensions to be used in standard sized chairs as can readily be calculated by one of skill in the art.

The custom-contoured cushion is preferably formed by custom molding. In a preferred custom molding process, a seating technician first measuring the user to determine the general dimensions required for the finished cushion. A bag conforming to such general dimensions is provided or constructed out of a suitable stretchable fabric. The bag is constructed with an opening through which the pellets, baseboard and support guides may be inserted. If a baseboard is to be included within the cushion, holes are drilled in the baseboard at locations appropriate for attaching hardware, and T-nuts are inserted into the holes. Support guides, if desired, are cut into the desired shape and affixed to the baseboard. The baseboard and support guides are then inserted into the bag, and the baseboard is positioned along the bottom of the bag.

A seating technician inserts the pellets into the bag, preferably until the bag begins to stretch, closes the opening, and places the bag on a simulator wheel-chair frame. The seating technician then places the intended user onto the bag to assess whether the bag contains a sufficient number of pellets to provide cushioning around the user's seating surface and whether the baseboard and support guides are in the correct position to provide postural support. The seating technician may remove the user from the bag and make any needed adjustments to the bag and/or its contents. This process is repeated until the bag is properly filled and the support guides are positioned correctly.

The two-part adhesive is added to the pellets, and the pellets and adhesive are mixed until the adhesive is fully mixed and the pellets are uniformly coated. The adhesive and pellets can be mixed in the bag, after adding the mixed two-part adhesive to the pellets within the bag. Alternatively, before adding the adhesive, the technician may remove the pellets from the bag and transfer them into a mixing tub. The two-part adhesive is added to the tub and the pellets and adhesive are mixed. The pellet/adhesive mixture is then inserted into the bag and the opening is re-closed.

In either process, the filled bag is again placed on the simulator frame and the intended user is re-positioned on the bag. While the adhesive is curing, the technician molds the pellet/adhesive mixture contained in the bag around the user and between the user's seating surface and any baseboard or support guides to provide cushioning around the seating surface, which results in a custom-molded cushion bearing an accurate impression of the seating surface. This may be done by pulling up on the bag and pushing the pellet/adhesive mixture into gaps between the user and the baseboard or support guides. During this process, the user may be removed from the cushion and the technician may push and/or pull the pellet/adhesive mixture into any spots where the user has bottomed out. The adhesive is then allowed to cure. Preferably the intended user remains on the cushion until the adhesive is cured.

When the adhesive has fully cured, approximately one hour from mixing, the cushion is complete and ready to be installed onto the wheelchair or other support structure. However, it may be desirable to modify the custom-molded cushion to add extra padding. For example, after curing, the technician or user may notice that additional pressure relief is needed at certain points. In such case, the technician may cut into the bag, pull the bag away from the pellet/adhesive mixture at the position that extra padding is needed and add a pad to the interior of the bag at the position that extra padding is needed. The hole in the bag may be patched with an additional piece of material from which the bag was cut, which piece may be affixed to the exterior of the bag, over the hole, with an adhesive. This patching material and method may also be used to repair damaged areas of the cushion after use by the user.

In one embodiment, prior to installing the cushion onto the wheelchair or other support structure, a cushion cover is added to the cushion. The cushion cover is preferably comprised of a terry cloth or fleece material cut and sewn into the shape of a sack that is slightly larger than the size of the cushion. The cushion cover preferably comprises a large opening, trimmed with an elastic band, zipper or other closure. The cushion cover is slipped over the cushion and held in place by the closure, which is preferably positioned on the underside of the cushion.

To install a cushion containing a baseboard, the technician first locates the T-nuts in the baseboard by feeling for the T-nuts through the bag. The aperture of a bracket is positioned against the exterior of the cushion, over the T-nut, and screws are inserted into the bracket aperture, through the bag and into the T-nut previously positioned within the board hole. The cushion can then be installed onto the wheelchair frame. If the baseboard is not present, the cushion may be affixed to a conventional wheelchair drop seat base or combined with other conventional hardware for installation onto the wheelchair or other support structure.

The molding process of the present invention produces an aesthetically pleasing custom-molded, custom-contoured cushion having a highly accurate impression of the intended user's seating surface which substantially alleviates pressure points that can cause discomfort and pressure sores. The cushion has a uniform texture and density without the hard spots that can result from other molding procedures. The molding process does not significantly alter the flexible qualities of the foam pellets, such that they remain resilient and soft, and the adhesive is sufficiently flexible and resilient to provide a comfortable cushion for the user. Adding support guides produces a comfortable cushion that also provides necessary postural support and may obviate the need for additional cumbersome and unsightly hardware.

The molding process is relatively quick, such that the cushion can be molded and installed onto the wheelchair during a one-day session, and it does not result in the messes sometimes associated with other molding processes. Further, the cushion is adaptable to a variety of wheelchair frames or other support structures.

DETAILED DESCRIPTION OF PREFERRED EMBODIMENT

Figure 1:
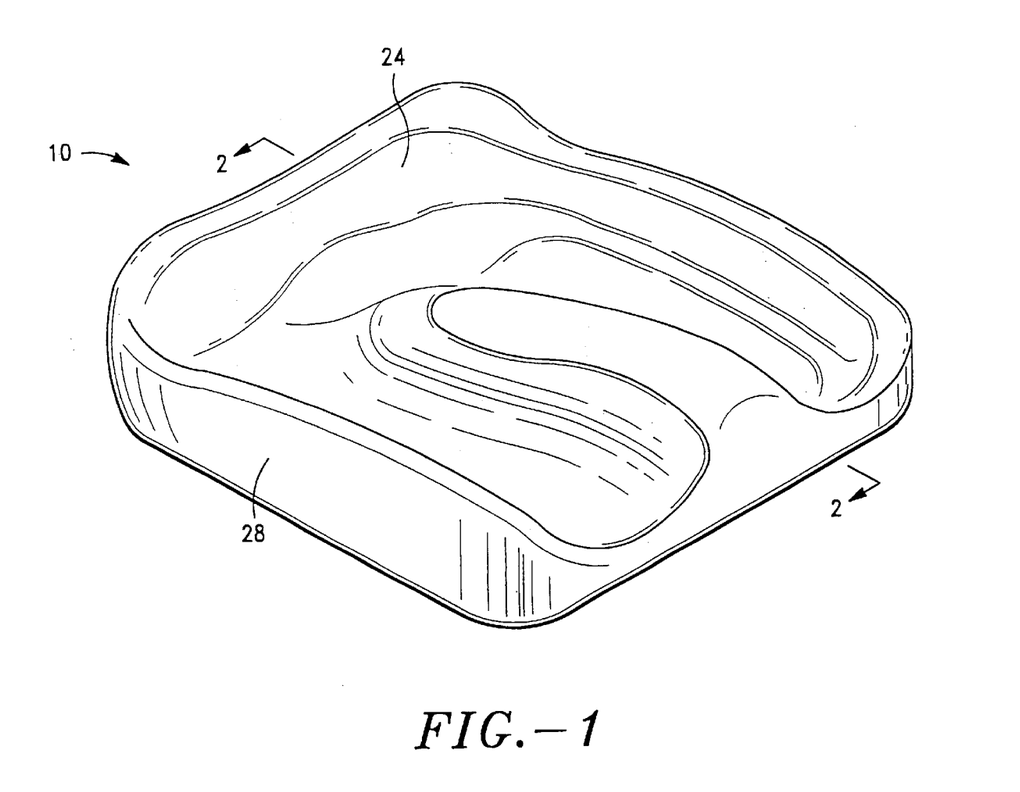
FIG. 1 is a perspective view of a custom-molded seat bottom cushion of the present invention.
Figure 2:
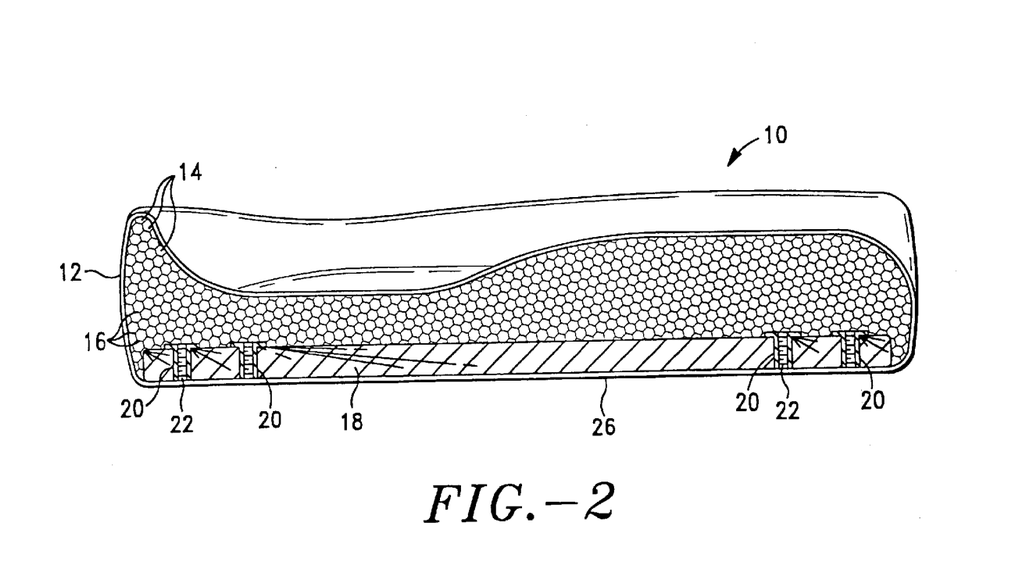
FIG. 2 is a cross-sectional view of the custom-molded seat bottom cushion of FIG. 1 taken along line 2—2 of FIG. 1.

Looking to FIG. 1, a custom-molded seat bottom cushion in accordance with the present invention is generally designated by the numeral 10. Turning to FIG. 2, cushion 10 is comprised of stretchable bag 12 containing pellets 14 held in place relative to each other and bag 12 by flexible polymerized adhesive 16. In the embodiment shown in FIG. 2, cushion 10 also comprises baseboard 18, which adds structure and support to cushion 10. Baseboard 18 preferably contains baseboard holes 20 for receiving T-nuts 22, which can be used to attach various types of hardware to cushion 10.

Cushion 10 is a custom-contoured seat cushion that contains an impression unique to the user's seating surface, including indentations to accommodate any bony protrusions of the user, such as the ischium. The dimensions of top surface 24, bottom surface 26 and side surfaces 28 of cushion 10 may be customized to the specific user and wheelchair frame, as can be readily calculated by one in the seating art. In a typical seat, the dimensions of top surface 24 and bottom surface 26 of the finished seat bottom cushion will range in size from 11 inches wide by 11 inches deep to 21 inches wide by 21 inches deep, and the dimensions of cushion side surfaces 28 will range from 2 inches tall by 11 inches across to 8 inches tall by 21 inches across.

The exterior of cushion 10 is formed by bag 12. Bag 12 is a flexible bag having top, bottom and sides that correspond to top surface 24, bottom surface 26 and sides surfaces 28 of cushion 10, respectively. Bag 12 is constructed such that it will form cushion 10 of the desired dimensions when filled with pellets 14 and adhesive 16, taking into account any internal structures, such as baseboard 18, that are to be included in cushion 10. Bag 12 is formed with an opening large enough to allow insertion of pellets 14, adhesive 16 and any support structures. Preferably the opening extends along the full length of the back side surface 28. The opening is preferably provided with a zipper, hook and loop-type fasteners, or other sealing means known in the art, and preferably the opening can be repeatedly closed and reopened.

Bag 12 is preferably formed of a thin, stretchable material that is generally impermeable to water and other liquids. Silicone sheets, spandex and latex are sufficiently thin, stretchable and resilient to fit snugly around the molded pellets and adhesive without wrinkling, such that they may be used consistent with the present invention. Of course, other materials with similar characteristics may be used. The material may itself be water-resistant, or it may be laminated with a water-resistant coating. Preferably, bag 12 is comprised of a four-way stretch spandex material, with a laminated water-resistant coating. The sheet material is preferably between 0.005 and 0.075 inches thick, more preferably between 0.020 and 0.025 inches think and most preferably is 0.025 inches thick. The sheet material is preferably able to stretch to at least 1.25 times its original length and to snap back its original length after stretching. Spandex, such as that sold under the mark LYCRA, is a preferred material due to its high stretchability and because it is sufficiently thin. The preferred material is generally able to stretch from 1.25 to 6 times its original length. The most preferred material is able to stretch to at least about 1.75 times its original length and to return to approximately its original length after stretching. Further, spandex sheets can be purchased in a variety of colors and patterns, allowing the user to choose the color and pattern for his or her cushion. Silicone is another preferred material because it is thin, highly stretchable and inert. Use of inert silicone bags is particularly desirable for users with skin allergies. Flexible material of the preferred thickness allows accurate molding of cushion 10, such that custom-molded cushion 10 bears a highly accurate impression of the details of the intended user's seating surface.

In an alternative embodiment, a cushion cover (not shown), such as a zippered bag slightly larger than bag 12, can be affixed over cushion 10 to protect cushion 10 and/or to provide an aesthetically pleasing color or pattern for cushion 10. The use of a cushion cover is particularly desirable when bag 12 is made from silicone sheets, insofar as silicone sheets are somewhat transparent, allowing pellets 14 to show through bag 12. The cushion cover may be made of fabric, leather, vinyl or other material known in the art.

Preferably, the cushion cover is comprised of a terry cloth or fleece material, preferably POLARTECH fleece, which has been cut and sewn into the shape of a sack slightly larger than bag 12. The cushion cover preferably comprises a large opening, which is preferably trimmed with an elastic band, a zipper or other closure. The cushion cover covers a majority of the exterior surface of cushion 10, and is held in place by the elastic band, which is preferably positioned on the underside of cushion 10.

In one embodiment, the interior of cushion 10 contains pellets 14 adhered together, and preferably to the interior surface of bag 12, by adhesive 16. Adhesive 16 coats pellets 14 such that pellets 14 are, in effect, embedded within adhesive 16. A sufficient amount of adhesive is used to form a thin coating of adhesive on pellets 14. Preferably the ratio of adhesive 16 to pellets 14 ranges from 1:24 to 1:40 by volume, more preferably from 1:28 to 1:36, and most preferably the ratio of adhesive to pellets is 1:32 by volume. In an alternative embodiment, cushion 10 does not comprise adhesive 16, and pellets 14 are able to move relative to each other within bag 12 after construction of cushion 10 is complete.

Pellets 14 are soft, resilient and non-absorbent. The softness of pellets 14 provides comfort to the user. The resilience of the pellets allows them to deform when pressure is exerted against them, and return to substantially their original form when the pressure is removed, thereby preventing undesirable dents in the cushion caused by usage. In addition, pellets 14 are preferably comprised of a material that is generally impermeable to the adhesive and other liquids, such that it will not readily absorb, or react with, adhesive 16 or other liquids. Absorption of, or reaction with, adhesive 16 can cause pellets 14 to become hard and lose resiliency. Hard and non-resilient pellets create variations in the texture and density of cushion 10 that can create uncomfortable pressure points for the user.

Pellets 14 in accordance with the present invention are comprised of a soft, resilient generally non-absorbent foam, preferably a foam rubber or sponge rubber foam. The foam rubber or sponge rubber foam may be an open or closed-cell foam, preferably a closed-cell foam. Pellets consistent with the present invention may be comprised of materials selected from the group consisting of hydrocarbon polymers, neoprene, styrene-butadiene-rubber (SBR), ethylene-propylene-diene-monomer (EPDM), polyethylene, ethylene-vinyl acetate copolymer (EVA), nitrile, polyvinyl chloride (PVC), vinyl nitrile and vinyl butyl. Pellets consistent with the present invention can be purchased under the trademark BONDAFLEX from Monmouth Rubber & Plastics Corp. of Long Branch, N.J. or the trademark MLC BLACK from Rubberlite, Inc. of Huntington, W.Va.

Pellets 14 are preferably between ¼ to ⅜ inches in cross section. Pellets 14 must be sufficiently small to allow details of the user's seating surface to be molded into the cushion. The use of small pellets 14 also provides a smooth surface for cushion 10, unlike the uneven surface produced by hard Styrofoam pellets. The smooth surface adds to the comfort and aesthetic appeal of cushion 10.

Adhesive 16 is preferably comprised of a low-foaming polymerizable elastomeric compound that has a cure time over 15 minutes. Non-foaming compounds may also be used. In a preferred embodiment, adhesive 16 also has good wetting characteristics, and is a free flowing fluid when it is first mixed to allow it to readily mix with and coat individual pellets 14. When the adhesive is fully cured, it remains soft and resilient, but maintains the relative position of pellets 14 and bag 12 and preferably adheres pellets 14 to the interior surface of bag 12.

Small details of the user's seating surface can be molded into the surface of cushion 10 because pellets 14 are relatively small, bag 12 is comprised of a thin stretchable material, and adhesive 16 has a relatively long cure time. Preferably the full cure time of the compound will be between 1 and 2 hours, and the compound will have a 100 gram mass gel time of at least 2 minutes, preferably between 5 and 15 minutes and most preferably between 7 and 10 minutes. In a preferred embodiment, adhesive 16 is a low-foaming, two-part urethane adhesive, and more preferably is a two-part polyurethane adhesive comprised of a polyol resin and an isocyanate. Two-party polymerizable adhesives are preferably because the polymerizable adhesive can cure within closed bag 12 unlike adhesives that require evaporation or solvent release to cure. Three urethane adhesives consistent with the present invention are sold by Star Technology, Inc. of Waterloo, Iowa under the names M-253-2, M-271-2 and M-115-1. Other two-part urethane adhesives consistent with the present invention are sold by Epic Resins.

Figure 3:
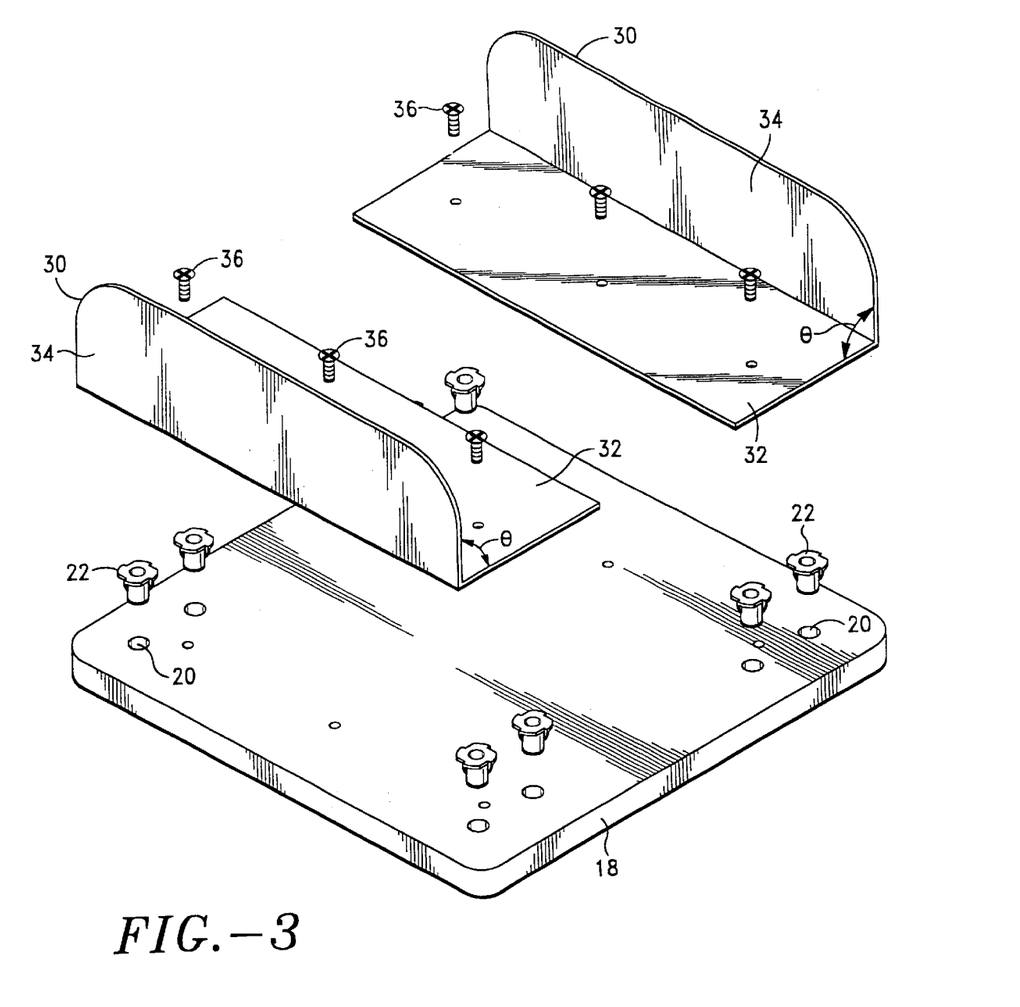
FIG. 3 is an exploded view of a baseboard and hip support guides for use in one embodiment of the present invention.

Baseboard 18, best seen in FIGS. 2 and 3, may be employed in cushion 10 to provide structure and support to cushion 10, and to provide a substrate to which various types of hardware can be attached. Baseboard 18 may be positioned within bag 12 along the bottom of bag 12. Baseboard 18 may simply be inserted into bag 12 or may be affixed to the interior surface of bag 12 with hook and loop type fasteners, straps, spray adhesive, screws, staples, or any other fasteners known in the art. Alternatively, baseboard 18 may be located on the exterior of bag 12 along the bottom of bag 12 (not shown). In such embodiment, the exterior of cushion 10 may be affixed to baseboard 18, as described above, or may simply rest on baseboard 18. Optionally, baseboard 18 is not included at all. In such embodiments cushion 10 may be affixed to a conventional drop seat base or directly to the wheelchair frame by a hook and loop type fastener, straps, spray adhesive, screws, staples or any other fastener known in the art, or may otherwise be installed on a wheelchair or other base by any fastening means known in the art.

Baseboard 18 can be any relatively stiff and flat structural member, as will be readily recognized by those in the art. Baseboards 18 in accordance with the present invention may be selected from the group comprising plywood, wood, metal, plastic or combinations thereof. In a preferred embodiment baseboard 18 is plywood, more preferably a multi-layer birch plywood and most preferably a 7-layer birch plywood. Baseboard 18 can be any shape that will add support to the user or structure to cushion 10. In the preferred embodiment shown in the figures, baseboard 18 is square. Baseboard 18 preferably contains several baseboard holes 20 for receiving T-nuts 22. T-nuts 22 can be used to attach various types of hardware to cushion 10, as will be readily recognized by those in the art.

As shown in FIG. 3, hip support guide 30, having a base portion 32 and a back portion 34, may be employed to provide added structure and support to cushion 10. Preferably, both back portion 34 and base portion 32 are planar and back portion 34 extends upwardly from an outer edge of base portion 32 to form an angle $\theta$ between base portion 32 and back portion 34. In the preferred embodiment, angle $\theta$ between base portion 32 and back portion 34 is approximately 90 degrees, preferably slightly less than 90 degrees. Preferably, two hip support guides 30 are affixed along opposing edges of baseboard 18 by guide screws 36 or any other suitable fastener. Hip support guide 30 preferably is constructed with oval, or elongated, guide holes (not shown), through which guide screws 36 are inserted to fasten hip support guide 30 to baseboard 18 or other support structure. The elongated guide holes allow adjustment of the position of hip support guide 30 by allowing hip support guide 30 to be moved relative to guide screw 36 along the length of the elongated guide hole. Hip support guide 30 may be formed in any shape, length and height that will provide structure and support to the cushion and/or may be customized to provide support where needed by an individual user. A customized hip support guide 30 may be used in place of separate modular hip guides known in the art to produce a unitary comfortable cushion that provides postural support for the user. Hip support guide 30 and baseboard 18 may be positioned inside bag 12 of cushion 10. Alternatively, either or both may be positioned on the exterior of cushion 10 and held in place by any means known in the art.

Hip support guide 30 may be constructed of any material sufficiently rigid and strong to provide structure to cushion 10 and support to the user. Preferably hip support guide 30 is constructed of plastic, wood, or metals. Hip support guide 30 more preferably is comprised of ABS plastic, most preferably of ⅛ to ¼ inch thick ABS plastic. The edges of hip support guide 30 can be sanded to prevent wearing or rubbing against bag 12. If further protection against wearing or rubbing is desired, a thin layer of foam, preferably foam rubber (not shown) can be positioned over hip support guide 30 and affixed thereto with quick setting spray adhesive, or any other suitable fastener known in the art. The foam rubber layer also provides the user with a comfortable cushion against hip support guide 30.

Figure 4:
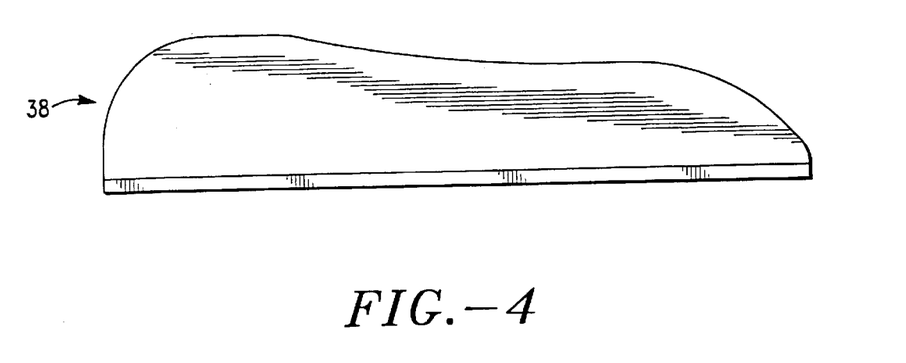
FIG. 4 is a side view of a lateral support guide for use in one embodiment of the present invention.

Hip support guide 30 is suitable for use in a seat bottom cushion. When cushion 10 is designed as a seat back cushion, lateral support guide 38, shown in FIG. 4, may be used in place of hip support guide 30. Lateral support guide 38 is similar to hip support guide 30, but is designed to provide support to a seat back cushion and to the back and trunk of the user. Preferably, two lateral support guides 38 are positioned along opposing sides of the seat back cushion.

Figure 5:
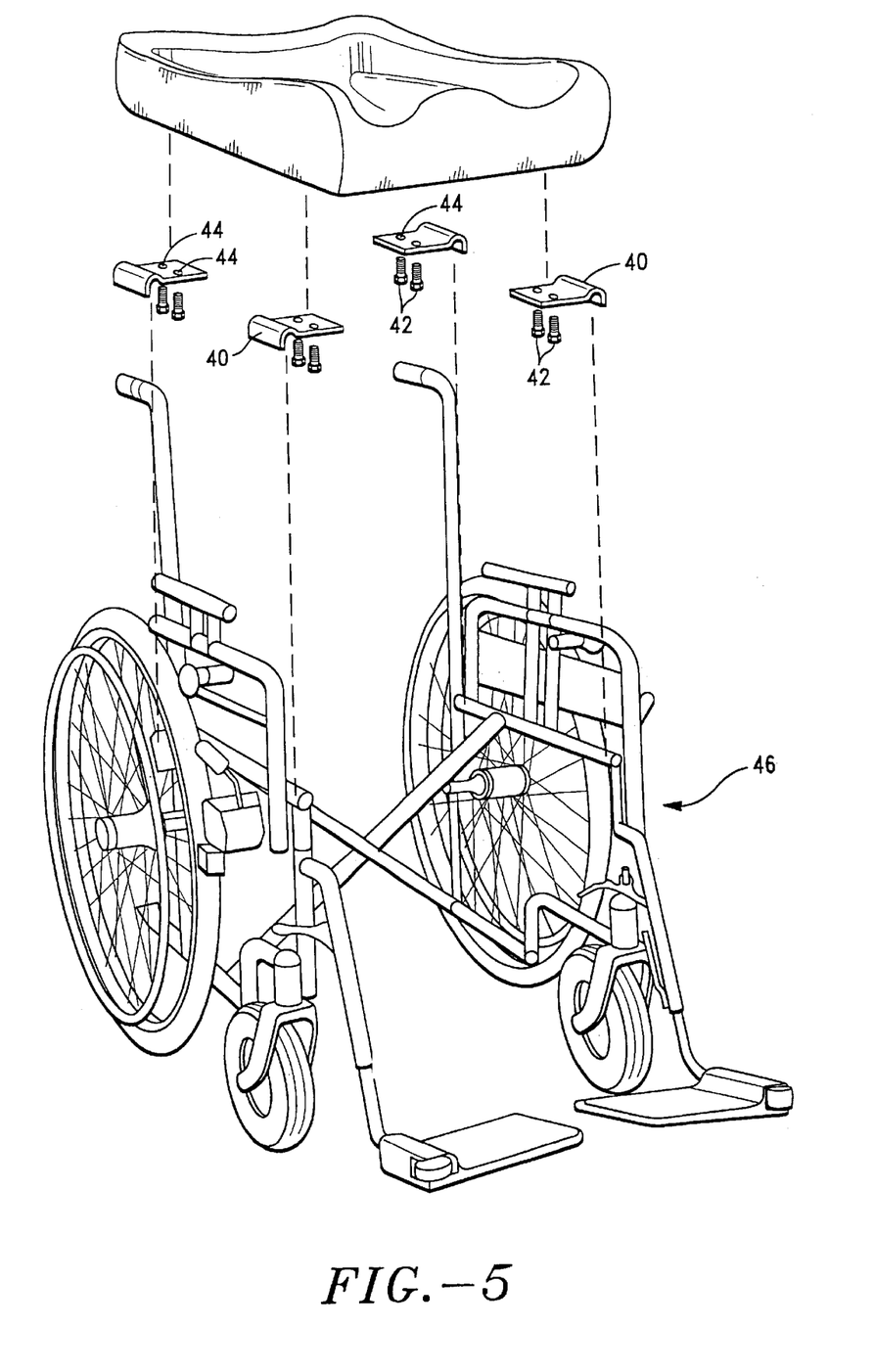
FIG. 5 is an exploded view of a custom-molded seat bottom cushion of the present invention in association with a conventional wheelchair frame.

Turning to FIG. 5, cushion 10 may also comprise brackets 40 and bracket screws 42. Apertures 44 of brackets 40 are positioned over appropriate T-nuts 22 in baseboard 18 and held in place by bracket screws 42, which extend through apertures 44, through bag 12 and into T-nuts 22 in baseboard 18.

In one embodiment, cushion 10 may additionally comprise additional pads within bag 12, located at positions on cushion 10 where additional pressure relief is needed. Such pads may be formed in any desired shape and may be comprised of any foam or other padding material known in the art. If such pads are added after construction of cushion 10, the hole in bag 12, into which the pad was inserted, is covered by a patch. Preferably the patch is comprised of the same material as bag 12, although any material known in the art may be used. The patch is preferably held in place using an acrylic adhesive, although any adhesive or mechanical fastener known in the art may be used.

To form custom-contoured seat bottom cushion 10 of the present invention, a seating technician first measures the user to determine the general dimensions needed for the finished cushion. The dimensions will depend on the size and weight of the user, the intended use of the cushion, the internal support structures to be included and other factors specific to the individual user, as is known in the art.

A stretchable bag 12 conforming to the general dimensions of the finished cushion is constructed out of a suitable stretchable, water-resistant material. Bag 12 is constructed with an opening over which a suitable faster, such as a zipper, preferably is affixed, such that the opening may be repeatedly closed and reopened.

If baseboard 18 is to be included within cushion 10, baseboard holes 20 are drilled into baseboard 18 at appropriate locations for attaching hardware such as brackets 40, and T-nuts 22 are inserted into the holes. Hip support guides 30, if desired, are cut into the desired shape and affixed to baseboard 18 with guide screws 36, or any other suitable fastener. Baseboard 18, optionally bearing hip support guides 30, is then inserted into bag 12 and is positioned along the interior of bag 12 along the interior surface of the cushion bottom. Baseboard 18 may be affixed to the interior of bag 12, along the interior of the cushion bottom, with any suitable adhesive or fastener, as described above.

The seating technician inserts pellets 14 into bag 12. Preferably, the technician will add pellets 14 until bag 12 stretches slightly. Although the number of pellets will depend upon the intended user and application, as will be readily understood by one in the art, a cushion measuring 18 inches wide by 18 inches deep by 4 inches tall will typically require 8 gallons of pellets 14.

The technician then closes the opening of bag 12, places bag 12 on a simulator wheelchair frame, or the frame of the user's wheelchair, and sets the user onto bag 12. The technician then positions the user correctly on bag 12 and examines the pellet-filled bag to assess if there are sufficient pellets 14 to prevent wrinkling of bag 12 and to provide cushioning around the user's seating surface and between the seating surface and baseboard 18 and hip support guides 30. The technician will also assess if hip support guides 30 (if included) are in the correct position to provide support to the user. If necessary, the seating technician may remove the user off of bag 12 and make any needed adjustments to the number of pellets 14 and/or position of hip support guides 30. This process is repeated until bag 12 is properly filled and support guides 30 are correctly positioned.

The user is removed off of bag 12. The two-part polymerizable adhesive 16 is added to the pellets 14 and pellets 14 and adhesive 16 are mixed to form a pellet 14/adhesive 16 mixture. Adhesive 16 is added until pellets 14 are coated, preferably in the ratio discussed above, and pellets 14 and adhesive 16 are mixed until adhesive 16 is fully mixed and pellets 14 are uniformly coated. Pellets 14 and adhesive 16 are preferably mixed within bag 12. In such embodiment, the two part adhesive is mixed outside of bag 12, preferably by adding one part of the mixture to the canister containing the other part of the mixture, and the two part adhesive is poured into the pellet 14 filled bag 12. The zipper is closed, and pellets 14 and adhesive 16 are blended by vigorously kneading the bag, in a manner similar to kneading bread dough, for approximately five (5) minutes. In an alternative embodiment, the pellets 14 and adhesive 16 are mixed outside of bag 12, in a mixing tub. In such an embodiment, after bag 12 is properly filled with pellets 14 and the user is removed off of bag 12, as described above, the technician opens the bag opening and empties pellets 14 from the interior of bag 12 into a mixing tub. The two part adhesive is added to the tub and pellets 14 and adhesive 16 are stirred until pellets 14 are coated with adhesive 16. The pellet 14/adhesive 16 mixture is inserted into bag 12 and the opening is re-closed. In both embodiments, after mixing is complete, filled bag 12 is again positioned correctly on the chair frame, and the user is re-positioned on pellet-filled bag 12.

As adhesive 16 polymerizes, it begins to restrict movement between pellets 14, providing a soft moldable mixture with which the seating technician can work into shape around the user. To mold custom-contoured cushion 10, bearing an accurate impression of the user's seating surface, the technician molds pellet 14/adhesive 16 mixture contained in bag 12 around the user by pushing pellet 14/adhesive 16 mixture around the user's seating surface to provide cushioning around the user's seating surface and between the seating surface and baseboard 18 or hip support guides 30. This may be done by pulling up on bag 12 and pushing the pellet 14/adhesive 16 mixture into any gaps between the user and baseboard 18 or hip support guide 30. The technician should have ample time to mold the cushion properly before the adhesive cures to a point that prevents further molding, approximately 20 to 30 minutes in the preferred embodiment. In addition, during the first thirty minutes after mixing, the technician may remove the user and visually inspect the molded cushion for problems such as "bottoming out," which may then be corrected by pushing the pellet/adhesive mixture into any spots where the user has bottomed out. Adhesive 16 is then allowed to cure.

When adhesive 16 has fully cured, approximately one hour after mixing, the user is removed from cushion 10, and cushion 10 is ready to be installed onto the wheelchair frame 46, as shown in FIG. 5. If additional pads are to be employed, the technician cuts a hole in bag 12 at the location where the pad is to be positioned, pulls bag 12 away from the cured pellet 14/adhesive 16 mixture, and inserts the pad within bag 12. A patch, preferably comprised of the same material of bag 12, is cut into a size larger than the hole and is affixed to the exterior of bag 12, over the hole, with any appropriate adhesive or mechanical fastener, preferably an acrylic adhesive. This patching method is also suitable for repairing areas of bag 12 that are damaged during use. Further, the method of inserting pads may be used to add pads before installing cushion 10 onto wheelchair frame 46, or after cushion 10 has been used for a period of time if the user notices pressure points that need additional padding.

In a preferred embodiment, before cushion 10 is installed onto wheelchair frame 46, a cushion cover is slipped over the exterior of cushion 10 and fixed in place, preferably using an elastic band affixed around the opening of the cushion cover.

To install a cushion containing baseboard 18 onto wheelchair frame 46, the technician must first locate T-nuts 22 in baseboard 18, as shown in FIGS. 2 and 3. Returning to FIG. 5, apertures 44 of brackets 40 are positioned against the exterior of cushion 10, over T-nuts 22, and bracket screws 42 are inserted into apertures 44, and screwed through bag 12 and into T-nuts 22 within baseboard holes 20. Cushion 10, bearing brackets 40, can then be dropped onto wheelchair frame 46.

If baseboard 18 is not present within bag 12, baseboard 18 may be affixed to the exterior of cushion 10 by an adhesive or mechanical fasteners, as described above. Preferably baseboard 18 is affixed with hook and loop-type fasteners or straps. In such embodiment, hip support guides 30 may be affixed to exterior baseboard 18 or to the exterior of cushion 10. Alternatively, cushion 10 may be affixed to a conventional wheelchair drop seat base or other conventional hardware for installation onto the wheelchair or other support structure. A variety of other mechanisms for installing cushion 10 onto a wheelchair or other support structure will be readily recognized by those in the art and can be accomplished using hardware known in the art.

In another aspect of the invention, pellets 14 are not embedded within adhesive 16. To form cushion 10 of such embodiment, bag 12 may be provided or formed in dimensions specific to the intended user, as described above, or in dimensions for use in standard wheelchairs, as can readily be calculated by one of skill in the art. The appropriate number of pellets 14 for each size of bag 12 may be determined by positioning a person or object on cushion 10 filled with pellets 14 to assure that there are a sufficient number of pellets 14 to provide cushioning around the entire seating surface. The number of pellets 14 may be adjusted if necessary.

It is to be understood that although specific embodiments of a seat bottom cushion are shown in the figures, cushion 10 may be formed as a seat back cushion, a head rest, or any other type of cushion in which it is desirable reflect the unique characteristics of the user and various modifications may of course be made. The novel cushion may be used on a wheelchair, or any other support structure. It should also be understood that a cushion of the present construction could be formed using a standard form for non-custom use. Alternatively, the custom-molded cushion could be molded to conform to any object, including human users and inanimate objects.

From the foregoing it will be seen that this invention is one well adapted to attain all ends and objectives hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, is to be understood that all matters herein set forth or shown in the accompanying drawing is to be interpreted as illustrative, and not in a limiting sense.

What is claimed and desired to be secured by Letters Patent is as follows:

1. A molded seat cushion comprising:
   a stretchable water-resistant bag;
   a resilient polymerized adhesive; and
   a plurality of pellets formed from a soft and resilient material that does not generally absorb or react with said adhesive, wherein said pellets are adhered together by said adhesive, and said pellets and adhesive are enclosed within said bag.

2. The seat cushion as claimed in claim 1, wherein a surface of the cushion has been molded to conform to the shape of an object.

3. The seat cushion as claimed in claim 1, wherein said pellets are comprised of a material selected from the group consisting of foam rubber and sponge rubber foam.

4. The seat cushion as claimed in claim 1, wherein said pellets are comprised of a material selected from the group consisting of hydrocarbon polymers, neoprene, styrene-butadiene-rubber (SBR), ethylene-propylene-diene-monomer (EPDM), polyethylene, ethylene-vinyl acetate copolymer (EVA), nitrile, polyvinyl chloride (PVC), vinyl nitrile and vinyl butyl.

5. The seat cushion as claimed in claim 1, wherein said pellets have a diameter ranging from ¼ to ⅜ inch.

6. The seat cushion as claimed in claim 1, wherein said adhesive is a low-foaming adhesive.

7. The seat cushion as claimed in claim 1, wherein said adhesive is a two-part polyurethane adhesive.

8. The seat cushion as claimed in claim 1, wherein said bag is comprised of a material that is sufficiently thin to allow accurate molding of the cushion.

9. The seat cushion as claimed in claim 1, wherein said bag is comprised of a material that is between 0.005 and 0.075 inches thick.

10. The seat cushion as claimed in claim 9, wherein said material is between 0.020 and 0.025 inches thick.

11. The seat cushion as claimed in claim 10, wherein said material is about 0.025 inches thick.

12. The seat cushion as claimed in claim 1, wherein said bag is comprised of a material that is able to stretch to at least 1.75 times its original length.

13. The seat cushion as claimed in claim 1, wherein said bag is comprised of a material selected from the group consisting of spandex, silicone and latex.

14. The seat cushion as claimed in claim 2, wherein said bag is comprised of a material that is sufficiently thin to allow accurate molding of the cushion.

15. The seat cushion as claimed in claim 2, wherein said bag is comprised of a material selected from the group consisting of spandex, silicone and latex.

16. The seat cushion as claimed in claim 2, further comprising a baseboard positioned along a base of said cushion, inside said bag.

17. The seat cushion as claimed in claim 16, further comprising a rigid support guide affixed to said baseboard along an edge of said baseboard.

18. The seat cushion as claimed in claim 3, wherein said pellets are comprised of a material selected from the group consisting of hydrocarbon polymers, neoprene, styrene-butadiene-rubber (SBR), ethylene-propylene-diene-monomer (EPDM), polyethylene, ethylene-vinyl acetate copolymer (EVA), nitrile, polyvinyl chloride (PVC), vinyl nitrile and vinyl butyl.

19. The seat cushion as claimed in claim 3, wherein said adhesive is a two-part polyurethane adhesive.

20. The seat cushion as claimed in claim 3, wherein said bag is comprised of a material that is sufficiently thin to allow accurate molding of the cushion.

21. The seat cushion as claimed in claim 3, wherein said bag is comprised of a material that is between 0.005 and 0.075 inches thick.

22. The seat cushion as claimed in claim 3, wherein said bag is comprised of a material selected from the group consisting of spandex, silicone and latex.

23. A custom-molded seat cushion comprising:

- a stretchable water-resistant bag comprised of a material having a thickness between 0.020 and 0.025 inches thick;
- a resilient polymerized low-foaming two-part urethane adhesive; and
- a plurality of formed from a soft resilient closed-cell foam pellets that does not generally absorb or react with said adhesive, wherein said foam pellets are selected from the group consisting of foam rubber and sponge rubber foam;

wherein said pellets are adhered together by said adhesive;

wherein said pellets and said adhesive are enclosed within said bag; and wherein a surface of the cushion has been molded to bear an accurate impression of a surface of an object.

24. A seat cushion comprising:

a stretchable water-resistant bag; and a plurality of pellets formed from a soft resilient foam, wherein said pellets are enclosed within said bag and said pellets are able to move relative to one another within said bag, and wherein said pellets are selected from the group consisting of foam rubber and sponge rubber foam.

\* \* \* \* \*

UNITED STATES PATENT AND TRADEMARK OFFICE
CERTIFICATE OF CORRECTION

PATENT NO. : 6,611,980 B2
DATED : September 2, 2003
INVENTOR(S) : Patrick L. Wempe It is certified that error appears in the above-identified patent and that said Letters Patent is hereby corrected as shown below:

<u>Title page,</u>
Item [57], ABSTRACT,
Line 21, delete "has" and insert -- bag -- therefor.

<u>Column 6,</u>
Line 5, delete "think" and insert -- thick -- therefor.

Signed and Sealed this

Thirtieth Day of December, 2003

JAMES E. ROGAN
*Director of the United States Patent and Trademark Office*